United States Patent [19]

Danzig et al.

[11] 4,104,330

[45] Aug. 1, 1978

[54] SYNTHESIS AND COPOLYMERIZATION OF TAPERED BLOCK MACROMER MONOMERS

[75] Inventors: Morris J. Danzig, Skokie, Ill.; Ralph Milkovich, Murrysville, Pa.

[73] Assignee: CPC International Inc., Englewood Cliffs, N.J.

[21] Appl. No.: 690,757

[22] Filed: May 27, 1976

[51] Int. Cl.² .............................................. C08F 297/04
[52] U.S. Cl. ............................. 260/880 B; 260/878 R; 260/879; 260/880 R
[58] Field of Search ............................. 260/880 B, 879

[56] References Cited

U.S. PATENT DOCUMENTS

| | | | |
|---|---|---|---|
| 3,135,716 | 6/1964 | Uraneck | 260/880 B |
| 3,175,997 | 3/1965 | Hsieh | 260/880 B |
| 3,177,190 | 4/1965 | Hsieh | 260/880 B |
| 3,786,116 | 1/1974 | Milkovich | 260/885 |
| 3,832,423 | 8/1974 | Milkovich | 260/880 B |
| 3,842,146 | 10/1974 | Milkovich | 260/879 |
| 3,862,077 | 1/1975 | Schulz | 260/879 |
| 3,947,536 | 3/1976 | Horiie | 260/880 B |

*Primary Examiner*—Paul R. Michl
*Attorney, Agent, or Firm*—Brumbaugh, Graves, Donohue & Raymond

[57] ABSTRACT

The present invention relates to a novel composition of matter comprising: polymerizable "tapered" (or "graded") block macromolecular monomers, each of said polymerizable monomers comprising at least one polymeric segment having at least about 20 uninterrutped recurring monomeric units of at least one anionically polymerized mono-alkenyl-substituted aromatic hydrocarbon and a copolymerized segment of a mono-alkenyl-substituted aromatic hydrocarbon and a conjugated diene; each of said polymerizable monomers terminating with no more than one polymerizable end group containing a moiety selected from the group consisting of vinyl, vinylene, glycol, epoxy, or thioepoxy groups per mole of said polymerizable monomers, said polymerizable monomers denoted as preferably having a substantially uniform molecular weight distribution such that their ratio of $\overline{M}w/\overline{M}n$ is less than about 1.1, where $\overline{M}w$ is the weight average molecular weight of the polymerizable monomers and $\overline{M}n$ is the number average molecular weight of the polymerizable monomers, said polymerizable monomers being further characterized as capable of copolymerizing with a second polymerizable compound having a relatively low molecular weight to yield a chemically joined, phase separated thermoplastic graft copolymer, said copolymerization occurring through said polymerizable end group, said polymerizable end group thereby occurring as an integral part of the backbone of said chemically joined, phase separated thermoplastic graft copolymer. Also disclosed are chemically joined, phase separated thermoplastic graft copolymers prepared from the polymerizable monomers.

61 Claims, No Drawings

SYNTHESIS AND COPOLYMERIZATION OF TAPERED BLOCK MACROMER MONOMERS

BACKGROUND OF THE INVENTION (a) Statement of the Invention

The present invention relates to polymerizable macromolecular monomers and chemically joined, phase separated thermoplastic graft copolymers.

(b) Description of the Prior Art

Polymer technology has developed to a high degree of sophistication and extensive research efforts to this direction are being undertaken to obtain improvements in polymer properties. Some of these efforts lead to polymer materials capable of competing with metals and ceramics in engineering applications.

Attempts have been made to blend two different types of polymers in order to obtain the desired properties of each polymer component in the blend, but these attempts have generally been unsuccessful due to incompatibility. Despite the general acceptance of the fact of incompatibility of polymer pairs, there is much interest in devising means whereby the advantageous properties of combinations of polymers may be combined into one product.

One way in which this objective has been sought involves the preparation of block or graft copolymers. In this way, two different polymeric segments, normally incompatible with one another, are joined together chemically to give a sort of forced compatibility. In such a copolymer, each polymer segment continues to manifest its independent polymer properties. Thus, the block or graft copolymer in many instances possesses a combination of properties not normally found in a homopolymer or a random copolymer.

U.S. Pat. No. 3,235,626 to Waack, assigned to Dow Chemical Company, describes a method for preparing graft copolymers of controlled branch configuration. It is described that graft copolymers are produced by first preparing a prepolymer by reacting a vinyl metal compound with an olefinic monomer to obtain a vinyl terminated prepolymer. After protonation and catalyst removal, the prepolymer is dissolved in an inert solvent with a polymerization catalyst and the prepolymer is thereafter reacted with either a different polymer having a reactive vinyl group or a different vinyl monomer under free-radical conditions.

The limitations on the preparation of these copolymers are mechanistic. Thus, there is no means for controlling the spacing of the sidechains along the backbone chain and the possibility of the sidechains having irregular sizes. Due to the mechanistic limitations of the prior art methods, i.e., the use of an alpha-olefin terminated prepolymer with acrylonitrile or an acrylate monomer under free-radical conditions, complicated mixtures of free homopolymers result.

In view of the above considerations, it would be highly desirable to devise a means for preparing graft copolymers wherein the production of complicated mixtures of free homopolymers is minimized and the beneficial properties of the sidechain and backbone polymer are combined in one product.

It is recognized and documented in the literature, such as R. Waack et al, Polymer, Vol. 2, pp. 365–366 (1961), and R. Waack et al, J. Org. Chem., Vol. 32, pp. 3395–3399 (1967), that vinyl lithium is one of the slowest anionic polymerization initiators. The slow initiator characteristic of vinyl lithium when used to polymerize styrene produces a polymer having a broad molecular weight distribution due to the ratio of the overall rate of propagation of the styryl anion to that of the vinyl lithium initiation. Accordingly, following the practice of U.S. Pat. No. 3,235,626, a graft copolymer having sidechains of uniform molecular weight cannot be prepared.

U.S. Pat. Nos. 3,390,206 and 3,514,500 describe processes for terminating free-radical and ionic polymerized polymers with functional groups which are described as capable of copolymerizing with polymerizable monomers. The functionally terminated prepolymers described by these patentees would be expected to have a broad molecular weight distribution and, therefore, would not be expected to develop ultimate physical properties which are found in polymers formed from prepolymers having narrow molecular weight distribution.

U.S. Pat. No. 3,786,116 to Milkovich and Chiang, granted on Jan. 15, 1974 (which is assigned to the same assignees as the present application, the disclosure of which is incorporated herein by reference) describes phase separated thermoplastic graft copolymers derived from ethylenically unsaturated monomers as the backbone comonomer, and as side chains, copolymerized macromolecular monomers having substantially uniform molecular weight distribution formed from anionically polymerized monomers.

U.S. Pat. No. 3,842,146 to Milkovich and Chiang, granted on Oct. 15, 1974, which is also assigned to the same assignee as the present application (and is also incorporated herein by reference) discloses and claims polymerizable di-block macromolecular monomers of a polymerized monoalkenyl-substituted aromatic hydrocarbon and a polymerized conjugated diene and having a polymerizable end group. The polymerizable di-block macromolecular monomers have a substantially uniform molecular weight distribution. Copolymers of such macromolecular monomers with backbone-forming graft copolymerizing monomers are disclosed and claimed in U.S. Pat. No. 3,862,263, granted Jan. 21, 1975, of Milkovich, Chiang and Schulz, the disclosure of which is also incorporated herein by reference.

These polymerizable macromolecular monomers and graft copolymers overcome many of the aforementioned disadvantages of prior art compositions.

It is a particular object of the present invention to effect even further improvement over the polymeric compositions of the prior art.

SUMMARY OF THE INVENTION

The present invention relates to polymerizable "tapered" (or "graded") block macromolecular monomers having a substantially uniform molecular weight distribution such that their ratio of $\overline{M}w/\overline{M}n$ is less than about 1.1, where $\overline{M}n$ is the number average molecular weight of the polymerizable monomers, said polymerizable monomers being characterized by the formula:

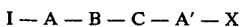

$$I-A-B-C-A'-X$$

wherein "I" is the residue of an anionic initiator, "A" and "A'" are each a polymerized mono-alkenyl-substituted aromatic hydrocarbon, "B" is a polymer of a conjugated diene, "C" is a tapered or graded copolymer of a mono-alkenyl-substituted aromatic hydrocarbon and a conjugated diene, and "X" is a polymerizable end group containing either a vinyl moiety, a vinylene moiety, a glycol moiety, an epoxy moiety, or a thioepoxy moiety.

The macromolecular monomers of the present invention are made by anionic polymerization employing an active anionic initiator such as sec.-butyl lithium in an anhydrous solvent such as benzene. A terminal block of polymerized mono-alkenyl-substituted aromatic hydrocarbon, preferably polystyrene designated as the group "A" is first formed by adding monomeric styrene. After the styrene is polymerized, there is added a mixture in desired molecular ratio of a mono-alkenyl-substituted aromatic hydrocarbon and a conjugated diene such as butadiene or isoprene. The polymerization immediately commences again because of the presence of the living polymer. Due to the substantially higher reactivity of the diene, however, it polymerizes first in preference to the mono-alkenyl-substituted aromatic hydrocarbon, thereby forming the block designated as "B". After a substantial amount of the diene is polymerized, its concentration becomes significantly depleted and at the relatively higher concentrations of the mono-alkenyl-substituted aromatic hydrocarbon, it begins to copolymerize with the diene. There is formed, therefore, what is termed a graded or tapered block designated as "C" which at first contains a relatively high proportion of the diene, but as the latter is used up, gradually becomes higher and higher in the proportion of the mono-alkenyl-substituted aromatic hydrocarbon, until at the other end of the graded block it approaches substantially all of the latter, thereby forming the group designated as "A'".

The tapered block macromolecular monomer of the present invention has been found to provide valuable aid in the graft copolymerization with the backbone-forming comonomers. Thus, in some systems for the graft copolymerization of macromolecular monomers of the diblock type referred to above, especially in suspension polymerization, the suspension droplet becomes a poor solvent for the macromolecular monomers or diblock monomer, resulting in low conversions of macromolecular monomer, or in other words low levels of incorporation of the macromolecular monomer into the graft copolymer. This behaviour was found to be prevalent when attempting to graft copolymerize styrene diblock macromolecular monomer where no co-solvent was used. In other instances, when the styrene level in the droplet was reduced to a low level due to consumption of the styrene in the graft copolymerization, the end of the molecule having the reactive group is non-solvated and thus cannot react readily with a comonomer. By using the tapered block macromolecular monomers of the present invention, however, the end of the macromolecular chain, having a functional group such as styrene or other mono-alkenyl-substituted aromatic hydrocarbons, thereby increases the solvency of the functional group on the macromolecular monomers when using an aromatic comonomer such as styrene and thereby enhances the incorporation of these types of macromolecular monomers into the backbone of the graft copolymer to a much greater degree.

Furthermore, the tapered block macromolecular monomers of the present invention enable one to obtain a much broader range of glass transition temperatures (Tg's), as explained more fully hereinafter, if one desires to have such physical properties.

The polymerizable tapered or graded block macromolecular monomers will generally have a molecular weight in the range of from about 5,000 to about 50,000. Preferably, the polymerized mono-alkenyl-substituted aromatic hydrocarbon "A" portion of the polymerizable monomers will have a molecular weight in the range of from 2,000 to about 25,000, and the portion designated as "B-C-A'", which includes the tapered or graded block copolymer "C" portion of the polymerizable monomer will have a molecular weight in the range of from about 1,500 to about 48,000.

The preferred mono-alkenyl-substituted aromatic hydrocarbon for the formation of the groups designated as "A" and "A'" is styrene, but alpha-methyl styrene is also contemplated. Moreover, mixtures of styrene and alpha-methyl styrene may be used for the formation of the groups "A", "C" and "A'", in which case the different reactivities of these two monomers produces a further degree of tapering or grading of the blocks "A", "C" and "A'", leading to interesting and desirable properties and behavior in the polymerization process and the final products.

The present invention also relates to thermoplastic graft copolymers comprised of copolymeric backbones containing a plurality of uninterrupted repeating units of the backbone polymer and at least one integrally copolymerized moiety per backbone polymer chain having chemically bonded thereto a substantially linear polymer which forms a copolymerized side chain to the backbone, wherein each of the polymeric side chains has substantially the same molecular weight and each polymeric side chain is chemically bonded to only one backbone polymer. Each of said linear polymer side chains is formed from a high molecular weight polymerizable (or macromolecular) monomer comprising at least one polymeric segment having at least about 20 uninterrupted recurring monomeric units of at least one anionically polymerized compound which is a mono-alkenyl-substituted aromatic hydrocarbon, said macromolecular monomer also comprising a copolymerized segment of a mono-alkenyl-substituted aromatic hydrocarbon and a conjugated diene. Each of said macromolecular monomers terminates with no more than one polymerizable end group containing a moiety selected from vinyl, vinylene, glycol, epoxy, or thioepoxy groups per mole of said macromolecular monomers which is the aforesaid integrally copolymerized moiety. Said macromolecular monomers are characterized as having a substantially uniform molecular weight distribution such that their ratio of $\overline{M}w/\overline{M}n$ is less than about 1.1, where $\overline{M}w$ is the weight average molecular weight of the macromolecular monomers and $\overline{M}n$ is the number average molecular weight of the macromolecular monomers. Said macromolecular monomers are further denoted as capable of copolymerizing with a second polymerizable compound having a relatively low molecular weight to obtain said copolymeric backbone, which is a chemically joined, phase separated thermoplastic graft copolymer, said copolymerization occurring through said polymerizable end group, said polymerizable end group thereby occurring as an integral part of the backbone of said chemically joined, phase separated thermoplastic graft copolymer.

The graft copolymers of the present invention assume a "T" type structure when only one side chain is copolymerized into the copolymeric backbone. However, when more than one side chain is copolymerized into the backbone polymer, the graft copolymer may be characterized as having a comb-type structure illustrated in the following manner:

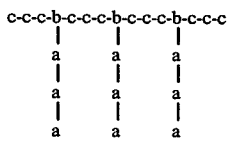

wherein "a" represents a substantially linear, uniform molecular weight polymer or copolymer having a sufficient molecular weight such that the physical properties of at least one of the substantially linear polymers are manifest and having the other previously mentioned characteristics described hereinafter in more detail; "b" represents a reacted and polymerized end group chemically bonded to the side chain, "a", which is integrally polymerized into the backbone polymer, and "c" is the backbone polymer having uninterrupted segments of sufficient molecular weight such that the physical properties of the polymer are manifest.

The backbone of the graft copolymers of the present invention preferably contains at least about 20 uninterrupted recurring monomeric units in each segment. It has been found that this condition provides the graft copolymer the properties of the polymer. In other words, the presence of segments containing at least about 20 uninterrupted recurring monomeric units provides the graft copolymers with the physical properties attributed to this polymer, such as crystalline melting point (Tm) and structural integrity.

The backbone polymeric segments of the chemically joined, phase separated thermoplastic graft copolymers of the present invention are derived from copolymerizable monomers, preferably the low molecular weight monomers. A particularly preferred group of copolymerizable monomers includes the non-polar or ethylenically-unsaturated monomers, especially the monomeric vinylidene type compounds, i.e., monomers containing at least one vinylidene

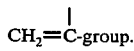

$CH_2=C$-group.

The vinyl type compounds represented by the formula

$CH_2=C-$ wherein a hydrogen is attached to one of the free valences of the vinylidene group are contemplated as falling within the generic scope of the vinylidene compounds referred to hereinabove.

The backbone polymers of the present invention are also comprised of polyolefins which include polymers of alpha-olefins of the formula:

$CH_2 = CHR$ wherein R is either hydrogen, or an alkyl or aryl radical containing 1 to about 16 carbon atoms, and include ethylene, propylene, butene-1, pentene-1, hexene-1, styrene, etc.; copolymers of alpha-olefins including the ethylene-propylene copolymers; and polymers of polymerizable dienes including butadiene, isoprene, etc.

The copolymerizable backbone-forming monomers useful in the practice of the present invention are not limited by the exemplary classes of compounds mentioned above. The only limitation on particular monomers to be employed is their capability to copolymerize with the polymerizable end groups on the side chain prepolymer under free-radical, ionic, condensation, or coordination (Ziegler or Ziegler-Natta catalysis) polymerization reactions. As it will be seen from the description of macromolecular monomers, described hereinbelow, the choice of polymerizable end groups includes any polymerizable compound commercially available. Accordingly, the choice of respective polymerizable end group and copolymerizable monomer can be chosen, based upon relative reactivity ratios under the respective copolymerization reaction conditions suitable for copolymerization reaction. For example, alpha-olefins copolymerize with one another using Ziegler catalysts, and acrylates copolymerize with acrylonitrile and other alkyl acrylates. Accordingly, an alpha-olefin terminated macromolecular monomer copolymerizes with ethylene and alpha-olefins using a Ziegler catalyst and an acrylate or methacrylate terminated macromolecular monomer copolymerizes with acrylonitrile, acrylates and methacrylates under free-radical conditions in a manner governed by the respective reactivity ratios for the comonomers.

As will be explained hereinafter, the excellent combination of beneficial properties possessed by the graft copolymers of the present invention are attributed to the large segments of uninterrupted copolymeric backbones and the integrally copolymerized linear side chains of controlled molecular weight and narrow molecular weight distribution.

The term "linear", referred to hereinabove, is being used in its conventional sense, to pertain to a polymeric backbone that is free from cross-linking.

The side chain polymers having substantially uniform molecular weight are comprised of substantially linear polymers and copolymers produced by anionic polymerization of a mono-alkenyl-substituted aromatic hydrocarbon and a conjugated diene. Preferably, the side chain polymer will be different than the backbone polymer.

It is preferred that at least one segment of the side chain polymer of the graft copolymers of the present invention have a molecular weight sufficient to manifest the beneficial properties of the respective polymer. In other words, physical properties of the side chain polymer such as the glass transition temperature (Tg) will be manifest. Generally, as known in the art, the average molecular weight of the segment of the polymeric side chains necessary to establish the physical properties of the polymer will be from about 5,000 to about 50,000.

In light of the unusual and improved physical properties possessed by the thermoplastic graft copolymers of the present invention, it is believed that the monofunctionally bonded polymeric side chains having substantially uniform molecular weight form what is known as "glassy domains" representing areas of mutual solubility of the respective side chain polymers from separate backbone copolymers.

The invention is illustrated further by the following examples which, however, are not to be taken as limiting in any respect. In each case, all materials should be pure and care should be taken to keep the reacted mixtures dry and free of contaminants. All parts and percentages, unless expressly stated to be otherwise, are by weight.

EXAMPLE 1

Preparation of macromolecular monomer having the following structure:

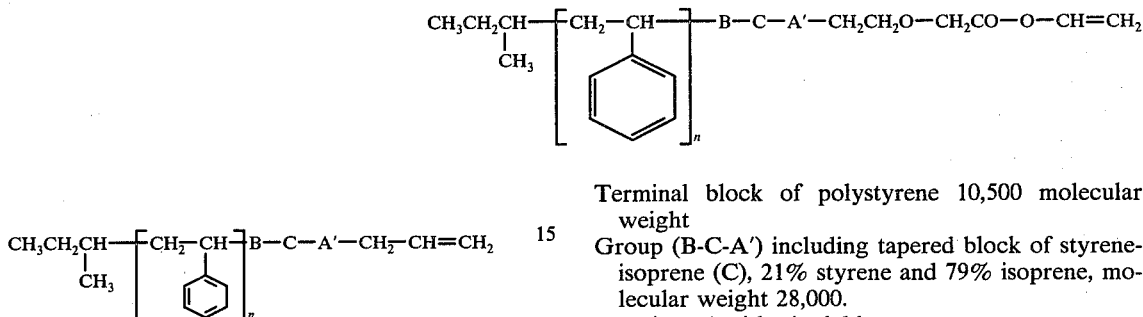

wherein the group designated as "B", "C", and "A'" have the meanings given above.

Terminal polystyrene block, 11,000 molecular weight
Group (B-C-A') including tapered block of styrene-isoprene (C), 21% styrene and 79% isoprene, molecular weight 30,000
Terminated with alpha-olefin Two liters of purified benzene were charged to a one gallon Chemco reactor and heated to 40° C. The benzene was sterilized with the sec-butyl lithium using 1,1-diphenylethylene as an indicator. Sec-butyl lithium was added until a pale yellow color was maintained for one minute.

8.1 ml. (11.06% solution in hexane) of sec-butyl lithium initiator was added to the reactor, and the benzene solution developed a red color due to the presence of the diphenylethylene anion. 95.6 g. of styrene monomer was added over a three minute period while maintaining the reactor temperature at 40° C. As the styrene polymerized, the solution changed to red-orange. Thirty-five minutes after the styrene monomer addition was completed, a second monomer charge composed of 50 g. of styrene and 191.3 g. of isoprene was added in 1 minute. On addition of the mixed monomer solution, the solution color immediately changed to yellow, characteristic of the isoprene anion. The reaction temperature was maintained at 40° C. for 4.5 hours. After the first two hours, the solution color began gradually to change back to the red-orange color of the styryl anion. At the end of this time 2.0 ml. of allyl chloride was added to form the alpha-olefin end group. The 40° C. reactor temperature was maintained for an additional 30 minutes. On removal from the reactor, the macromolecular monomer solution was stored under nitrogen pressure. The solution was clear, colorless and of low viscosity (16.6% solids). GPC analysis of the initial polystyrene segment was made to determine its molecular weight, and it was found to have a molecular weight of 11,000, and the total molecular weight of the macromolecular monomer was estimated to be 41,000.

EXAMPLE 2

Preparation of macromolecular monomer having the following structure:

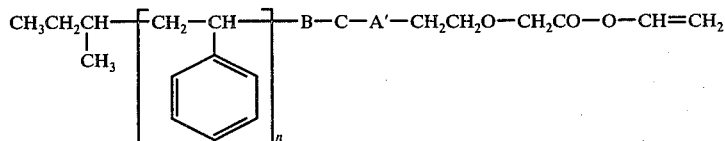

Terminal block of polystyrene 10,500 molecular weight
Group (B-C-A') including tapered block of styrene-isoprene (C), 21% styrene and 79% isoprene, molecular weight 28,000.
Terminated with vinylchloroacetate Two liters of purified benzene were charged to a 1 gallon Chemco reactor, and heated to 40° C. The benzene was sterilized with the sec-butyl lithium using 1,1-diphenylethylene as the indicator. Sec-butyl lithium was added until a pale yellow color was maintained for 1 minute.

9.5 ml. (11.06% solution in hexane) of sec-butyl lithium initiator was added to the reactor, and the benzene solution developed a red color due to the presence of the diphenylethylene anion. 110.0 g. of styrene monomer was added over a 3 minute period while maintaining the reactor temperature at 40° C. As the styrene polymerized, the solution color changed to red-orange. 25 minutes after the styrene monomer addition was completed, a second monomer charge composed of 58.6 g. of styrene and 220.1 g. of isoprene was added in 1 minute. On addition of the mixed monomer solution, the solution color immediately changed to yellow, characteristic of the isoprene anion. The reaction temperature was maintained at 40° C. for 1.5 hours, at which time the red-orange color of the styryl anion returned. 2 ml. of ethylene oxide was then added to form the colorless alkoxylate anion. The reactor temperature was maintained at 40° C. for an additional 1.5 hours, after which 2.5 ml. of vinyl chloroacetate was added. After 35 minutes the macromolecular monomer solution was removed from the reactor (21.3% solids) and stabilized with 0.2 Ionol CP antioxidant (based on total solids).

Gel permeation chromatography analysis of the initial polystyrene segment was made and it was determined to have a molecular weight of 10,500, and the total molecular weight of the macromolecular monomer was estimated to be 38,500.

EXAMPLE 3

Preparation of macromolecular monomer having the following structure:

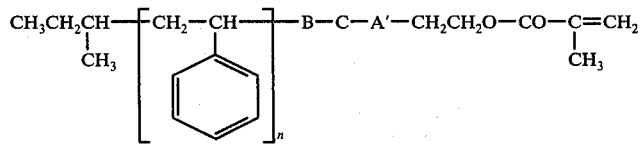

Terminal block of polystyrene, molecular weight 12,500
Group (B-C-A') including tapered block (C) of styrene: isoprene, ratio 10 parts to 90 parts Total molecular weight of macromolecular monomer 50,000
Terminated with methacrylate 2.5 liters of purified benzene were charged to a 1 gallon Chemco reactor, and heated to 40° C. The benzene was sterilized with sec-butyl lithium using 1,1-diphenylethylene as an indicator. Sec-butyl lithium was added until a pale yellow color was maintained for one minute.

7.6 ml. (11.6% solution in hexane) of sec-butyl lithium initiator was added to the reactor, and the benzene solution developed a red color due to the presence of the diphenylethylene anion. 88.7 g. of styrene monomer was added over a 2 minute period while maintaining the reactor temperature at 40° C. As the styrene polymerized, the solution color changed to red-orange. 25 minutes after the styrene monomer addition was completed, a second monomer charge composed of 26.3 g. of styrene and 239.6 g. of isoprene was added in two minutes. On addition of the mixed monomer solution, the solution color immediately changed to yellow, characteristic of the isoprene anion. The reaction temperature was maintained at 40° C. for 3.25 hours, at which time the red-orange color of the styryl anion had returned. 2 ml. of ethylene oxide was then added to form the colorless alkoxylate anion. The reactor temperature was maintained at 40° C. for an additional 1.25 hours, after which 2.0 ml. of methacryloyl chloride was added. After 30 minutes, the macromolecular monomer solution was removed from the reactor (14.5% solids) and stabilized with 0.2% Ionol CP antioxidant (based on total solids).

G.P.C. analysis of the initial polystyrene segment was made and it was determined to have a molecular weight of 12,500, and the total molecular weight of the macromolecular monomer was estimated to be 50,000.

EXAMPLE 4

Preparation of a macromolecular monomer having the following structure:

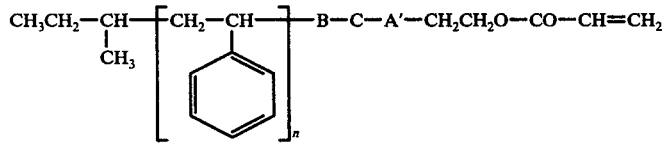

Initial block of styrene, molecular weight 11,000
Group (B-C-A') including tapered block copolymer (C) of styrene-isoprene, ratio 10 parts to 90 parts, molecular weight 30,000
Total molecular weight of macromolecular monomer 41,000
Terminated with the acrylate Two liters of purified benzene were charged to a 1 gallon Chemco reactor and heated to 40° C. The benzene was sterilized with the sec-butyl lithium using 1,1-diphenylethylene as an indicator. The sec-butyl lithium was added until a pale yellow color was maintained for 1 minute.

8.8 ml. (11.6% solution in hexane) of sec-butyl lithium indicator added to the reactor, and the benzene solution developed a red color due to the presence of the diphenylethylene anion. 102 g. of styrene monomer was added over a 2 minute period while maintaining the reactor temperature at 40° C. As the styrene polymerized, the solution changed to red-orange. Twenty-five minutes after the styrene monomer addition was completed, a second monomer charge composed of 25.5 g. of styrene and 257.0 g. of isoprene was added in one minute. On addition of the mixed monomer solution the color immediately changed to yellow, characteristic of the isoprene anion. The reaction temperature was maintained at 40° C. for 3.25 hours, at which time the red-orange color of the styryl anion had returned. 2.4 ml. of ethylene oxide was then added to form the colorless alkoxylate anion. The reaction temperature was maintained at 40° C. for an additional 1.25 hours, after which 2.0 ml. of acrylyl chloride was added. After 20 minutes, the macromolecular monomer solution was removed from the reactor (16.1% solids) and stabilized with 0.2% Ional CP antioxidant (based on total solids).

G.P.C. analysis of the initial polystyrene segment was made and was determined to have a molecular weight of 11,000, and the total molecular weight of the macromolecular monomer was estimated to be 41,000.

EXAMPLE 5

Preparation of a macromolecular monomer having the following structure:

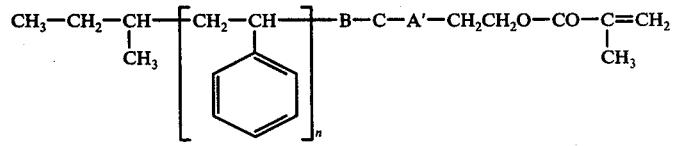

A terminal block of polystyrene, 10,000 molecular weight
A group (B-C-A') including a tapered block (C) of styrene 20 parts, isoprene 80 parts, total molecular weight 25,000
Terminated with methacrylate 2.5 liters of purified benzene was charged to a 1 gallon Chemco reactor and heated to 40° C. The benzene was sterilized with sec-butyl lithium using 1,1-diphenylethylene as an indicator. Sec-butyl lithium was added until a pale yellow color was maintained for 1 minute.

0.013 mole (11.1 ml. of 11.04% solution in hexane) of sec-butyl lithium initiator was added to the reactor and the solution developed a red color due to the diphenylethylene anion. 130.4 grams of styrene monomer was added over a 3 minute period while maintaining the reactor temperature at 40° C. As the styrene polymerized, the solution color changed to red-orange. 20 minutes after the styrene monomer addition was completed, a second monomer charge composed of 64.3 grams of styrene and 256.1 grams of isoprene (20:80 weight ratio of styrene to isoprene) was added in 2 minutes. On addition of the mixed monomer solution, the solution color immediately changed to yellow, characteristic of the isoprene anion. The reaction temperature was maintained at 40° C for 4.5 hours. 4.5 ml. of ethylene oxide liquid was added to form the colorless alkoxylate anion. The reaction temperature was maintained at 40° C. for 3 hours, after which time the solution was colorless. Methacryloyl-chloride was then added to terminate the living anion. On removal from the reactor the macromolecular monomer solution was stabilized with 0.2 Ional CP antioxidant (based on total solids).

EXAMPLE 6

Preparation of a macromolecular monomer having the following structure:

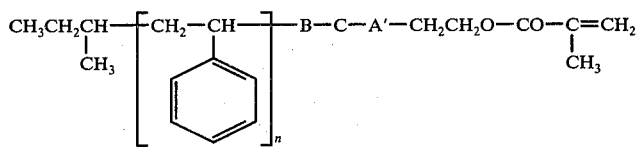

Terminal styrene block homopolymer, molecular weight 10,000

A group (B-C-A') including a tapered block (C) of styrene 40 parts, isoprene 60 parts, total molecular weight of tapered block 25,000

Terminated with methacrylate 2.5 liters of purified benzene was charged to a 1 gallon Chemco reactor and heated to 40° C. The benzene was sterilized using sec-butyl lithium and diphenylethylene as an indicator. 0.0128 moles (10.9 ml. of 11.4% solution) of sec-butyl lithium initiator solution is added to the reactor. 128.6 g. of styrene monomer was added in 4 minutes while maintaining the reactor temperature at 40° C. 20 minutes after the styrene monomer was added, a second monomer charge composed of 128.6 g. styrene and 192.8 g. of isoprene, 40:60 weight ratio, was added in 1.5 minutes. The reaction temperature was maintained at 40° C. for 2 hours. At the end of this time ethylene oxide gas was bubbled subsurface in the reactor for 3 minutes. The reactor temperature was maintained for 60 minutes. At the end of this time, methacryloylchloride was added to terminate the reaction.

EXAMPLE 7

The tapered block macromolecular monomers prepared according to Examples 5 and 6 were each copolymerized with styrene using an aqueous suspension recipe. The copolymerizations were carried out in one quart soda bottles rotated end-over-end for 21 hours in a polymerization bath at 70° C. The final product was very fine particle size beads (2-4 mm. average diameter). The beads were recovered on a 100-mesh stainless steel screen, washed with the distilled water and dried in a vacuum oven. The recipe and procedure are described below:

| Recipe | |
|---|---|
| Tapered block macromolecular monomer | 29.4 |
| Benzene (thiophene free) | 23.3 |
| Styrene | 67.0 |
| Azo-bis-isobutyronitrile (AIBN) | 0.268 |

| -continued | |
|---|---|
| Recipe | |
| Distilled water | 300 |
| Luviskol K-90 (BASF polyvinylpyrrolidone) | 0.50 |

PROCEDURE

The required amount of macromolecular monomer solution to obtain 29.4 grams of solids was weighed into a 500 ml. round bottom flask. The excess benzene was stripped off under vacuum at 50° C. using a rotary evaporator. During the stripping procedure, a nitrogen atmosphere was maintained over the macromolecular monomer solution. The stripped macromolecular monomer solution was cooled to room temperature under a nitrogen purge, and the flask sealed with a butyl rubber septum.

The initiator (AIBN) was dissolved in the styrene monomer and the solution charged to the flask containing the stripped macromolecular monomer benzene solution using a 100 ml. syringe. The flask was then shaken until a uniform solution was obtained.

The 1-quart soda bottle was rinsed with benzene, acetone, and distilled water and then dried in a 150° C. forced air oven. The bottle was cooled to room temperature under a nitrogen purge. The distilled water and suspension stabilizer (Luviskol K-90) were charged to the bottle, the bottle sealed with a butyl rubber septum, and purged with nitrogen for 1 hour.

The monomer solution was transferred from the 500 ml. round bottom flask to the bottle containing the water and suspension stabilizer using a 100 ml. syringe. The bottle was capped under a nitrogen blanket using a butyl rubber gasket with a Mylar linear and placed in the polymerization bath.

After 21 hours at 70° C. the bottle was removed from the polymerization bath. The copolymer beads were recovered by filtering onto a 100-mesh stainless steel screen. The beads were washed with distilled water and dried 20 hours at 50° C. under vacuum. 92.9 grams of copolymer beads were recovered. This corresponds to 94% styrene conversion with 32% by weight MACROMER ® present in the copolymer.

The physical properties of the tapered block macromolecular monomer copolymers were determined on compression molded samples. The macromolecular monomer copolymers were stabilized with 0.1% Irganox 1076 and 0.4% Uvi-nox 3100 prior to compression molding. The test bars were compression molded 8 minutes at 380° F. Milling of the copolymers formed from macromolecular monomers for 10 minutes at 290° F., compared to dissolving the copolymers in benzene and precipitating in isopropanol as a means of compounding in antioxidants, produced no significant change in physical properties.

The copolymer prepared from the macromolecular monomer of Example 5 had a flex modulus (psi × $10^5$) of 2.72, a heat distortion temperature of 173° F., and Izod impact (ft-lb/in) notched 0.2, unnotched 3.2; and percent light transmission of a molded bar (at 6–0 mu) of 62%. The copolymer formed from the macromolecular monomer of Example 6 had a flex modulus of 2.75, heat distortion temperature 178° F., Izod impact notched 0.0, unnotched 2.8, light transmission 65%.

EXAMPLE 8

The tapered block macromolecular monomer prepared according to Example 3 was copolymerized with styrene using an aqueous suspension recipe.

The copolymers were made in a weight ratio of 31:69 macromolecular monomer to styrene for Sample 1 and 42:58 for Samples 2 and 3. 0.4% of azobisisobutyrylnitrile (AIBN) was added to each, and 35% benzene was added based on the weight of the styrene for Sample 1 and 40% benzene was added for Sample 2 and 3.

PROCEDURE

The solution of macromolecular monomer (14.5% solids in benzene) for Sample No. 1 was stripped for 15 minutes and in Samples 2 and 3 for 25 minutes at 50° C. under about 70 mm of Hg. Copolymerization was carried out for 21 hours at 70° C.

Results: All of the bottles formed stable, small particle size suspensions (about 3 mm diameter beads) using tricalcium phosphate as a suspension stabilizer. The bottles were stripped using vacuum immediately after removal from the 70° C. bath to remove benzene. After stripping for 30 minutes, 75 ml of a 50/50 concentrated HCl in distilled water solution was added to the bottles (to dissolve calcium phosphate). The bottles were replaced in a 60° C. bath. After 10 minutes at 60° C. the beads in all the bottles had coalesced. The bottles were removed from the bath and allowed to cool at room temperature. After cooling to room temperature, the coagulated beads broke apart easily. The beads were washed with two liters of 0.3 N.HCl and then with distilled water. The washed beads were dried 20 hours at 50° C. under vacuum. Analysis of the beads showed that the copolymerization reaction went substantially to completion. Samples of each of the copolymer beads were dissolved in benzene for gel permeation chromatography (G.P.C.). None of the samples had a noticeable gel content.

In Sample No. 1 the ratio of macromolecular monomer to styrene was 31:69. It had normal molecular weight distribution centered at about 27 counts on the high molecular weight bank. A slight low molecular weight shoulder was visible at 32 counts (due to dead polystyrene chains initially present in the macromolecular monomer). The sample had no high molecular weight shoulder. The solution passed through the syringe filter without difficulty indicating no significant amount of microgel in the copolymer.

Sample No. 2 had a ratio of macromolecular monomer to styrene of 42:58. The molecular weight distribution was somewhat broader than for Sample No. 1 and centered at about 26.5 counts on the high molecular weight bank. A slight low molecular weight tail was visible at about 32 counts. The sample had a significant high molecular weight tail. The solution was difficult to get through the syringe filter indicating microgel present in the copolymer. The presence of microgel was also indicated by the high molecular weight tail.

Sample No. 3 also had a weight ratio of macromolecular monomer styrene of 42:58, the sample was very difficult to get through the syringe filter and plugged the G.P.C. columns so no chromatogram could be obtained.

EXAMPLE 9

Two portions (28 parts each) from Sample No. 1 of Example 8 were taken, one designated Sample A and the other Sample B. To each there was added 0.3% Irganox 1076, a commercial antioxidant, 0.9% Uvi-nox 3100 also an antioxidant, and 600 parts of benzene as solvent. To Sample B there was also added 15.4 parts (14.5% solution in benzene) of macromolecular monomer from Example 8, that is, having a terminal block of polystyrene, molecular weight 12,500, a tapered block of a copolymer of styrene and isoprene in the ratio of 10:90 by weight having a molecular weight of 37,500, terminated with methacrylate. Each solution was precipitated with about 4 liters of isopropanol. The precipitated polymers were recovered by filtering onto filter paper. Both samples were dried 4½ hours at 50° C. under vacuum. The dried samples were compression molded for testing and measuring of the physical properties. Sample A had a flex modulus of 2.50 psi $\times$ $10^5$, and Izod impact (2 pound head) of 0.1, 0.2 notch and 3.2, 4.0 unnotched. The appearance of the molded sample was clear with a pale yellow coloring. For Sample B, the flex modulus was 1.71 $\times$ $10^5$ psi. The Izod impact with the 2 lb. head, notched was 1.4 and 3.0. The Izod unnotched with the 5 lb. head did not break. The appearance of the sample was clear with a pale yellow coloring and bluish haze.

Sample C was taken from Sample No. 2 of Example 8. 19.0 parts were mixed with 0.3 parts of Irganox, 0.9% Uvi-nox 3100 and 600 parts of benzene. The solution was precipitated with about 4 liters of isopropanol. The precipitate was recovered by filtering onto filter paper and dried for 17 hours at 50° C. under vacuum. The sample was first molded into a sheet (1 minute at 310° F.). Several strips were superimposed and molded under heat and pressure (8 mins. at 380° F.) into bars which were 5 ins. long, ½ in. wide and ⅛ in. thick. The sample contained macromolecular monomer and styrene copolymerized in the weight ratio 42:58. It had a flex modulus 1.77 psi $\times$ $10^5$ and notched Izod of 0.6, 0.6 (ft. lb/in.) with a 2 pound head, an unnotched Izod 16.8 with a 10 pound head. It was clear and had no haze and had a pale yellow coloring.

Sample D was prepared from Sample No. 3 of Example 8 in the amount of 19.0 parts by weight of the copolymer mixed with 10.5 parts by weight (14.5% solution in benzene) of macromolecular monomer having the terminal block of styrene 12,500 molecular weight, the tapered copolymer block of styrene-isoprene at 10:90 ratio, molecular weight 37,500, terminated with methacrylate. To that was added 0.3% Irganox, 0.9% Uvi-nox and 600 parts by weight of benzene. The solution was precipitated with about 4 liters of isopropanol; the precipitated polymer was recovered by filtering onto filter paper and dried 17 hours at 50° C. under vacuum. The sample was molded into a sheet (1 minute at 310° F.). Bars were molded from strips cut from the prepressed sheets (8 minutes at 380° F.). The flex modulus was 1.35 psi $\times$ $10^5$; the Izod impact notched was 1.0 (ft. lb/in.) for one sample, another sample did not break; the unnotched Izod with a 10 lb. head did not break. The sample was clear without haze and had a pale yellow coloring.

Sample E was made from a mixture of 69 parts by weight (14.5% solution in benzene) of macromolecular monomer of Example 8, that is, having a styrene terminal block of molecular weight 12,500, a tapered block copolymer of styrene and isoprene ratio 10:90, molecular weight 37,500, terminated with methacrylate, 20 parts of Dow polystyrene X-grade, 0.3 parts Irganox antioxidant, 0.9 parts Uvi-nox antioxidant and 600 parts benzene. The solution in benzene was precipitated with about 4 liters if isopropanol, the precipitate was recovered by filtering on filter paper and drying for 17 hours at 50° C. under vacuum. The sample was first molded into a sheet (1 min. at 310° F.). Bars were molded from strips cut from the pressed sheet (8 min. 380° F). The flex modulus was 0.066 psi × 10$^5$; the Izod impact 2 lb. head notched was 1.4, 1.6 (ft. lb/in.); the unnotched Izod did not break with the 10 lb. head. Standard ASTM methods were used in testing. The flex modulus was by method D-790-66 and the impact modulus was determined by test D-256-56 methods A and C. The sample was opaque. These tests and observations indicate phase separation within the sample.

EXAMPLE 10

A macromolecular monomer was prepared having the following structure:

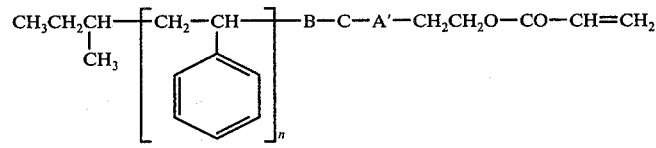

A terminal block of styrene of molecular weight 11,000

A group (B-C-A′) including a tapered block copolymer (C) of styrene and isoprene in the weight ratio of 10:90, molecular weight 30,000

Terminated with acrylate

The macromolecular monomer was copolymerized with styrene containing 0.4% by weight of AIBN. The monomer mixture contained 35.1 parts of macromolecular monomer, 27.9 parts of benzene, 80.3 parts of monomeric styrene, and 0.321 parts AIBN. The 1 quart polymerization bottle was charged with 400 parts of boiled, nitrogen-purged distilled water, 1 part of tricalcium phosphate and 126.4 parts of monomer solution (described above). The procedure used for the suspension polymerization was described in the previous examples. The copolymerization was carried out for 21 hours at 70° C. The benzene was stripped from the mixture for 18 minutes at 50° C. under about 65 mm of mercury absolute pressure. The polymer was in the form of beads having a diameter about 3 mm average. The bottles were stripped for 30 minutes through syringe needles using a vacuum pump. After stripping, 75 ml of a 50% aqueous solution of concentrated HCl was added. The bottles were replaced in the polymerization bath at 55° C. The beads remained discrete and were removed from the bath after 30 minutes, washed with 2 liters of 0.3 N. HCl, rinsed with distilled water, and dried in 24 hours at 50° C. using a vacuum pump. 102.4 parts by weight of beads were recovered having a true solids content of 95.7%. The percent styrene conversion was 94.6% and the percent of macromolecular monomer in the copolymer was 31.5%. The presence of rubber in the copolymer was 20.7%.

A solution was prepared from the copolymer with 50 parts of copolymer, 0.4 parts of Irganox 1076, 1.2 parts of Uvi-nox 3100 and 600 parts of benzene. The solution was precipitated with about 4 liters of isopropanol, the precipitated polymer was recovered by filtering onto Whatman No. 1 paper and dried for 6 hours at 50° C. under vacuum. A 60 mil sheet of precipitated sample was molded for 1 minute at 310° F. The sheet was clear and tough. Test bars were molded from strips cut from the prepressed sheets for 8 minutes at 380° F. These bars were clear and stiff.

As a comparison, the equivalent amount of styrene was polymerized in the presence of a nonfunctional tapered block macromolecular monomer having substantially the same composition as that described above the present example. A comparison of the physical properties of these two samples is shown below:

| Macromolecular monomer | Flex Modulus (psi × 10$^5$) | Izod Impact (ft lbs/in) | | Heat Distortion Temp (° F) | Appearance of Molded Bar |
|---|---|---|---|---|---|
| | | Notched | Unnotched | | |
| non-functional | 0.14 | 3.1 | 8.6 | < 78 | opaque |
| S11(SI 10:90)30A | 2.42 | 0.3 | 4.9 | 177 | clear |

The clarity and improved physical properties of the copolymer compared to the control demonstrate the functionality of the S11(SI 10:90)30A tapered block macromolecular monomer.

EXAMPLE 11

Preparation of Polystyrene-Polyisoprene Macromolecular Monomer Terminated with Allyl Chloride To a 1-gallon Chemco reactor, 2.5 liters of purified benzene was added, and heated to 40° C. After sterilization with sec-butyl lithium using diphenylethylene as an indicator, 15.3 ml. (0.0193 mole) of sec-butyl lithium (12% in hexane) was added via hypodermic syringe. 193 g. of styrene monomer was added in 5 minutes while maintaining the reactor temperature at 40° C. 6 minutes after styrene monomer was added, 193 g. of isoprene monomer was added in 4.5 minutes. The reactor was held at 40° C. for 60 minutes, then 2.4 ml. of allyl chloride was added to terminate the reaction. The alpha-olefin terminated polystyrene-polyisoprene macromolecular monomer has a structural formula represented as follows:

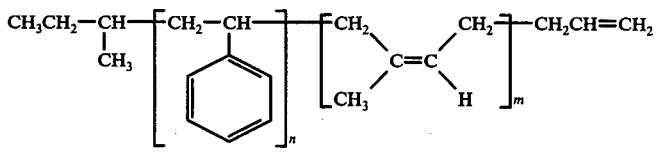

wherein $n$ is a value such that the molecular weight of the polystyrene is about 10,000 and $m$ is a value such that the molecular weight of the polyisoprene segment of the diblock macromolecular monomer is about 10,000. In a similar manner, graded or tapered block macromolecular monomers are prepared by substituting e.g. a 10:90 to 40:60 mole ratio of styrene to isoprene mixture for the isoprene in the foregoing procedure.

EXAMPLE 12

Preparation of Graft Copolymer from Polystyrene-Polyisoprene Macromolecular monomer Terminated with Allyl Chloride and Propylene To a one-half-gallon Chemco reactor, 60 g. of the alphaolefin terminated diblock macromolecular monomer (polystyrene-polyisoprene terminated with allyl chloride) prepared in the previous example was charged together with 1.5 liters of dry n-heptane. The reactor was purged with nitrogen for 40 minutes. 30 ml. of diethyl aluminum chloride (25% in n-heptane) was added, followed by 2.05 g. of titanium trichloride. The reactor was heated to 75° C, and propylene gas was introduced to the reactor at the rate of 1 liter/minute. Polymerization was carried out at 75° C, at 20-25 psi pressure while feeding propylene at the average rate of 0.5 liter/minute. After 2 hours, the reaction was terminated by the addition of ethanol. The resulting copolymer was washed with dilute sodium hydroxide solution and dried in a vacuum oven. IR analysis showed that the diblock macromolecular monomer was incorporated into the polypropylene backbone. The physical properties of the copolymer were tested and the results of the tests were as follows:

| | |
|---|---|
| Tensile Strength | 4970 psi |
| Yield Strength | 4720 psi |
| % elongation | 810% |
| Flexural Modulus | $2.05 \times 10^5$ psi |
| Heat Distortion Temperature | 144° F |
| Izod Impact | 1.0 ft. - lb./in. |

Similar copolymers are also made from the tapered block monomers described in Example 11.

EXAMPLE 13

Preparation of Polystyrene-Polyisoprene Macromolecular monomer Terminated with Allyl Chloride To a 1-gallon Chemco reactor, 2.5 liters of dry benzene was added and heated to 40° C. After sterilization with sec-butyl lithium using diphenyl ethylene as an indicator, 15.8 ml. (0.0199 mole) of sec-butyl lithium (12% in hexane) was added via hypodermic syringe. 80 g. of styrene monomer was added while maintaining the reaction temperature at 40° C. Thereafter, 319 g. of isoprene monomer was added and polymerization was carried out at 40° C. for 1 hour, and the living diblock polymer was terminated with 3.0 ml. of allyl chloride. The diblock macromolecular monomer had a formula represented as follows:

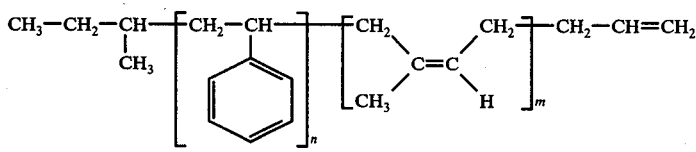

wherein $n$ is a value such that the molecular weight of polystyrene is about 4,000 and $m$ is a value such that the molecular weight of polyisoprene is about 16,000. Analysis of the diblock macromolecular monomer by gel permeation chromatography reveals that the molecular weight distribution of the polymer is extremely narrow, i.e., the ratio of $\overline{M}w/\overline{M}n$ is less than about 1.1. In a similar manner, graded or tapered block macromolecular monomers are prepared by substituting e.g. a 10:90 to 40:60 mole ratio of styrene to isoprene mixture for the isoprene in the foregoing procedure.

EXAMPLE 14

Preparation of Graft Copolymer from Polystyrene-polyisoprene Macromolecular Monomer Terminated with Allyl Chloride, and Ethylene To a one-half-gallon Chemco reactor, 300 ml. of the diblock macromolecular monomer as prepared in Example 13 (40 g. on dry basis) was charged together with 1.2 liters of dry cyclohexane. The reactor was purged with high purity nitrogen for 50 minutes. 22 ml. of ethylaluminum sesquichloride solution (25% in heptane) was added via hypodermic syringe. Ethylene was introduced to the reactor until the pressure reached 44 psi, and the mixture was stirred as rapidly as possible. 0.2 ml. of vanadium oxytrichloride was injected and polymerization started immediately. During the addition of the vanadium oxytrichloride, the temperature rose from 25° C. to 60° C. As the pressure dropped, ethylene was fed at the rate of 2 liters/minute. Polymerization was carried out for 12 minutes, and terminated by the addition of 10 ml. of ethanol. The polymer was purified by washing with cyclohexane, dilute sodium hydroxide solution, and dried in a vacuum oven. U.V. analysis of the copolymer showed that the copolymer contained 24% of the diblock macromolecular monomer. The physical properties of the copolymer were tested and the results of these tests are as follows:

| | |
|---|---|
| Yield Strength | 2500 psi |
| Tensile Strength | 2160 psi |

-continued

| | |
|---|---|
| % Elongation | 490% |
| Flexural Modulus | $0.6 \times 10^5$ psi |
| Heat Distortion Temperature | 98° F |
| Izod Impact | 12.8 ft. - lb./in. (specimen did not break) |

Similar copolymers are also made from the tapered block monomers described in Example 13.

EXAMPLE 15

Preparation of Polystyrene-Polyisoprene Macromolecular Monomer Terminated with Allyl Chloride To a 1-gallon Chemco reactor, 3.0 liters of purified benzene was added and heated to 40° C. After sterilization with sec-butyl lithium using diphenyl ethylene as an indicator, 46.5 ml. (0.0585 mole) of sec-butyl lithium (12% in hexane) was added via hypodermic syringe. 761 g. of styrene monomer was added in 15 minutes while maintaining the reaction temperature at 40° C. 5 minutes after completion of styrene monomer addition, 410 g. of isoprene monomer was added in 4 minutes. The reaction was held at 40° C. for 1 hour, then the reaction was terminated by the addition of 15 ml. of allyl chloride. The diblock macromolecular monomer had a structural formula as described in Examples 11 and 13 hereinabove, wherein the value of n was such that the molecular weight of polystyrene was about 13,000 and the value of m was such that the molecular weight of polyisoprene was 7,000. The diblock macromolecular monomer was analyzed by gel permeation chromatography and this analysis revealed that the molecular weight distribution of the polymer was extremely narrow, i.e., the $\overline{M}w/\overline{M}n$ ratio was less than about 1.1. In a similar manner, graded or tapered block macromolecular monomers are prepared by substituting e.g. a 10:90 to 40:60 mole ratio of styrene to isoprene mixture for the isoprene in the foregoing procedure.

EXAMPLE 16

Preparation of Graft Copolymer from Polystyrene-Polyisoprene Macromolecular Monomer Terminated with Allyl Chloride and Ethylene To a one-half-gallon Chemco reactor, 200 ml. of the diblock macromolecular monomer prepared in Example 15 (40 g. on dry basis) was charged together with 1.3 liters of cyclohexane. The reactor was purged with high purity nitrogen for 1 hour. 22 ml. of ethylaluminum sesquichloride solution (25% in heptane) was added. Ethylene was introduced to the reactor until the pressure reached 44 psi. Thereafter, 0.2 ml. of vanadium oxytrichloride was added and polymerization started immediately, and the temperature rose from 27° C to 55° C. As the pressure dropped, ethylene was fed at the rate of 2 liters/minute. Polymerization was carried out for 8 minutes, and terminated by the addition of 10 ml. of ethanol. The polymer was purified by washing with dilute sodium hydroxide solution, cyclohexane, and dried in a vacuum oven. U.V. analysis showed that the copolymer contained 38.5% of the diblock macromolecular monomer. The physical properties of the copolymer were tested and the results are as follows:

| | |
|---|---|
| Yield Strength | 5790 psi |
| Tensile Strength | 5920 psi |

| | |
|---|---|
| % Elongation | 77% |
| Flexural Modulus | $1.6 \times 10^5$ psi |
| Heat Distortion Temperature | 120° F |
| Izod Impact | 1.0 ft. - lb./in. |

Similar copolymers are also made from the tapered block monomers described in Example 15.

EXAMPLE 17

Preparation of Polystyrene-Polyisoprene Macromolecular Monomer Terminated with Allyl Chloride To a 1-gallon Chemco reactor, 2.5 liters of purified benzene was charged, and heated to 40° C. After sterilization with sec-butyl lithium using diphenyl ethylene as an indicator, 35.1 ml. (0.044 mole) of sec-butyl lithium (12% in hexane) was added hypodermic syringe. 442 g. of styrene was added in 13 minutes while maintaining the reactor temperature at 40° C. 10 minutes after styrene monomer was added, 88.4 g. of isoprene monomer was added in 4 minutes. The reactor was held at 40° C for 30 minutes, then 3.6 ml. of allyl chloride was added to terminate the reaction. The recovered diblock macromolecular monomer had the same structural formula as represented in Examples 11 and 13 hereinabove, with the exception that the value of n was such that polystyrene had a molecular weight of about 10,000 and the value of m was such that the molecular weight of polyisoprene was about 2,000. The polymer was analyzed by gel permeation chromatography and the analysis revealed that the molecular weight distribution of the polymer was very narrow, i.e., the $\overline{M}w/\overline{M}n$ ratio was less than about 1.1. In a similar manner, graded or tapered block macromolecular monomers are prepared by substituting e.g. a 10:90 to 40:60 mole ratio of styrene to isoprene mixture for the isoprene in the foregoing procedure.

EXAMPLE 18

Preparation of Graft Copolymer of Polystyrene-Polyisoprene Macromolecular Monomer Terminated with Allyl Chloride and a Mixture of Ethylene and Propylene To a one-half-gallon Chemco reactor, 155 g. of 19.3% by weight of the diblock macromolecular monomer prepared in Example 17 solution (30 g. on dry basis) was charged together with 1.6 liters of purified cyclohexane. 22 ml. of ethylaluminum sesquichloride solution (25% in heptane) was added via hypodermic syringe. Then 19 liters (35 g.) of propylene gas was introduced into the reactor. As soon as 0.2 ml. of vanadium oxytrichloride was injected, polymerization was started by continuous feed of ethylene. Ethylene was added to the reactor at the rate of 2 liters/minute for 14 minutes (35 g.) Polymerization was carried out for 24 minutes, and terminated by the addition of isopropyl alcohol.

The copolymer solution was placed in a stainless steel beaker and 1 liter of dilute sodium hydroxide solution and 1 g. of Irganox 1010 antioxidant was added. The mixture was stirred by Arde-Barinco Mixer to remove catalyst residue from the polymer. The copolymer was coagulated and dried, and evaluated as (1) thermoplastic elastomer, (2) alloying agent for blending commercial EPDM and polyisoprene for developing high impact plastics, (3) EP rubber which can be cured with conventional diene-based rubber to improve compatibility and ozone resistance.

Similar copolymers are also made from the tapered block monomers described in Example 17.

EXAMPLE 19

Preparation of Polystyrene-Polyisoprene Macromolecular Monomer Capped with Ethylene Oxide and Terminated with Methacrylyl Chloride A stainless steel reactor was charged with 195.22 kg. of purified benzene. The reactor was heated to 40° C and the solvent and reactor were sterilized with sec-butyl lithium using diphenyl ethylene as an indicator. Following sterilization, 126.58 g. (1.9764 moles) of sec-butyl lithium (12% in hexane) was added to the sterilized solvent, followed by the addition of 19.47 kg. of styrene over a period of 30–45 minutes, while maintaining the reactor temperature at 36°–42° C. Following the addition of the styrene, 48.62 kg. of isoprene was added to the reactor followed by the addition of 0.38 kg. of ethylene oxide to "cap" the diblock living polymer. The "capped" diblock polymer was terminated by the addition of 0.22 kg. of methacrylyl chloride to obtain the methacrylic acid ester represented by the formula:

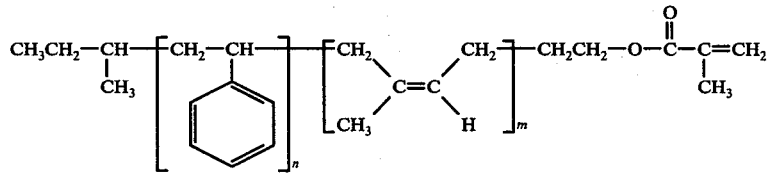

wherein n is a value such that the molecular weight of polystyrene is about 10,000 and m is a value such that the molecular weight of polyisoprene is about 25,000. Analysis of the diblock macromolecular monomer by gel permeation chromatography reveals that the molecular weight distribution of the polymer is extremely narrow, i.e., the ratio of $\overline{M}w/\overline{M}n$ is less than about 1.1. Following recovery of the macromolecular monomer, 68 g. of Agerlite Superlite (anti-oxidant) was added to the polymer to stabilize it against premature oxidation.

The procedure of Example 19 was repeated using in place of methacrylyl chloride, an equivalent amount of maleic anhydride to produce the maleic half ester of the polystyrene-polyisoprene diblock macromolecular monomer having the formula:

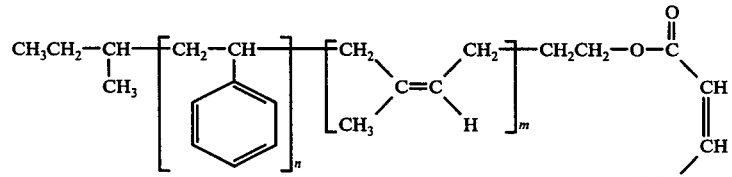

wherein n and m are positive integers as hereinabove defined. The graft copolymer was blended with polystyrene (DOW 666) to impart excellent properties. In a similar manner, graded or tapered block macromolecular monomers are prepared by substituting e.g. a 10:90 to 40:60 mole ratio of styrene to isoprene mixture for the isoprene in the foregoing procedure.

EXAMPLE 20

Preparation of Graft Copolymer from Methacrylate Ester Terminated Polystyrene-Polyisoprene Macromolecular Monomer and Styrene A suspension copolymerization using the methacrylate ester terminated polystyrene-polyisoprene diblock macromolecular monomer prepared in Example 19 was conducted by the procedure described below. An aqueous solution and a monomer solution were both freshly prepared before use. The ingredients of the aqueous stabilizer solution and monomer solution were as follows:

| Aqueous Stabilizer Solution | | |
|---|---|---|
| Distilled Water | 375 | g. |
| Polyvinyl Pyrrolidone (Luviskol K-90) | 0.625 | g. |
| Monomer Solution | | |
| Methacrylate terminated macromolecular monomer (Example 19) | 75.4 | g. |
| Styrene | 177 | g. |
| Benzene (solvent) | 52 | g. |
| AIBN (polymerization initiator) | 1.32 | g. |

The aqueous stabilizer solution was charged to a rinsed quart bottle, and the bottle was capped with a butyl rubber gasketed cap having a Mylar film lining. The bottle was purged with nitrogen via syringe needle before introducing the monomer solution. 146 g. of monomer solution was then charged to the bottle with a hypodermic syringe, and the bottle was placed in a bottle polymerization bath and rotated at 30 rpm at 65° C for 20 hours. The suspension was then cooled, filtered, washed with water, air dried, and screened at ambient temperature. 117 g. of the copolymer was recovered, representing a 95% conversion of styrene.

The chemically joined, phase separated graft copolymer was compression molded to a clear plastic and had the following physical properties:

| Flexural Modulus | 190,000 psi (13,360 kg./cm³) |
|---|---|
| Heat Distortion Temperature | 170° F (77° C) |
| Izod Impact Strength | 1.1 ft./lb. in. to |

| (Notched) | 9.5 ft./lb. in. |

As it can be seen from the above data, the copolymer had remarkable physical properties and had the added advantage of being a clear plastic.

In a similar manner, graded or tapered block macromolecular monomers are prepared by substituting e.g. a 10:90 to 40:60 mole ratio of styrene to isoprene mixture for the isoprene in the foregoing procedure.

The capability of being injection molded, and the lack of extractable curing ingredients are among the advantages offered by the novel macromolecular graft copolymers of the invention.

Polyblends Employing Macromolecular Monomers as Alloying Agents

Polyvinyl chloride blends with low levels of the macromolecular monomer/polyacrylate graft copolymers of the invention provide products that are clear, have improved processing and high impact properties. Notched Izod impact strengths of 22 ft. lbs./inch are obtained with little loss in flexural modulus in rigid polyvinyl chloride blends containing as little as 3% of the macromolecular monomer/poly(butyl acrylate) graft copolymer. The graft copolymers of the invention also function as processing aids by improving polyvinyl chloride fusion in milling and compression molding. The graft copolymers also impart high strength to higher molecular weight polyvinyl chloride polymers, such as Vygen 110 and 120, when low levels of the graft copolymer (macromolecular monomer/poly(butyl acrylate) is blended after the polyvinyl chloride is banded on the mill.

In addition to using the rubbery polystyrene/butyl acrylate graft copolymer as an alloying agent to polymers of vinyl chloride, the addition of this rubbery component can also be added to polymers of styrene or styrene-acrylonitrile copolymers for impact engineering plastics. The polyvinyl chloride polyblends with the graft copolymers have exceptionally high impact strength and are useful in pipe, siding, downspouts, cases, etc. This is unexpected because polyvinyl chloride is known for its low impact strength. Poly (methyl methacrylate) also has low impact strength, however, when a polymer of methyl methacrylate is either blended or copolymerized with the lower Tg or rubbery macromolecular monomers of the invention, the impact strength is enhanced.

The graft copolymers of the invention which have tapered block polystyrene side chains, improve the melt rheology of those polymers having a poor melt rheology and are difficult to process when small amounts of the graft copolymer is blended with the polymer. Examples of polymers which can be blended with the graft copolymers of the invention to improve the melt rheology include polymers of methyl methacrylate, acrylonitrile, and others.

The following chemically joined, phase separated combinations of systems can now be made in accordance with the practice of the present invention:
1. Low Tg disperse phase in high Tg matrix (impact plastics).
2. High Tg disperse phase in low Tg matrix (thermoplastic elastomers).
3. High Tg disperse phase in crystalline polymer matrix.
4. Low Tg disperse phase in crystalline polymer matrix.
5. High Tg disperse phase in high Tg matrix.

When the macromolecular monomers of the present invention are copolymerized with acrylate monomers, the product is a graft structure with a low Tg backbone as the matrix and with the macromoleclar monomer as the disperse phase. The polymer exceeds the strength properties of vulcanized acrylic rubbers. The macromolecular monomer-acrylic copolymers are thermally reformable and scrap material can be re-processed, whereas vulcanized rubbers cannot be re-processed. By varying the composition of the acrylic monomers and the macromolecular monomers, the thermoplastic copolymers range in properties from snappy elastomers to true plastics.

Copolymerization of a high Tg macromoleclar monomer with a rubber-forming monomer also allows one to use the graft copolymer as an alloying agent for dispersing additional rubber to make new impact plastics. Similar results are obtained using a suitable tapered block macromolecular monomer with an appropriate elastomer.

Styrene-based macromolecular monomers with the appropriate end group, as demonstrated in the above examples, are copolymerized with the following monomers, mixed ethylenepropylene, ethylene, propylene, acrylonitrile, methyl methacrylate, acrylics, isocyanates, and epoxides. Isoprene and tapered block macromolecular monomers are particularly suited as being copolymerized with vinyl-containing monomers such as styrene, styrene-acrylonitrile, ethylene, mixed ethylene and propylene, and propylene.

One of the most preferred embodiments of the present invention comprises a chemically joined, phase separated thermoplastic graft copolymer of:
1. From about 1% to about 95% by weight of a polymerizable comonomer selected from
    a. alpha-olefins of the formula:

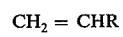

wherein R is hydrogen, alkyl or aryl radicals containing one to about 16 carbon atoms,
    b. a comonomeric mixture of ethylene and propylene,
    c. a diene selected from butadiene and isoprene,
    d. an ethylenically-unsaturated monomer containing at least one vinylidene

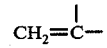

group selected from acrylic acid, methacrylic acid, the alkyl esters of acrylic and methacrylic acid, acrylonitrile, methacrylonitrile, acrylamide, methacrylamide, N,N-dimethylacrylamide, vinylidene cyanide, vinyl acetate, vinyl propionate, vinyl chloroacetate, fumaric acid and esters, maleic anhydride acids and esters thereof; and copolymerized with
2. A polymerizable tapered block macromolecular monomer of the formula:

wherein I is the residue of an anionic initiator, A and A' are each polymerized mono-alkenyl-substituted aromatic hydrocarbons, B is a polymer of a conjugated diene, C is a tapered or graded copolymer of such a mono-alkenyl-substituted aromatic hydrocarbon and a conjugated diene, and X is a polymerizable end group containing either a vinyl moiety, a vinylene moiety, a glycol moiety, an epoxy moiety, or a thioepoxy moiety, said tapered block macromolecular monomer having a molecular weight in the range of from about 5,000 to about 50,000, said tapered block macromolecular monomer being further characterized as having no more than one vinyl moiety, vinylene moiety, glycol moiety, epoxy moiety or thioepoxy moiety on the terminal portion per linear copolymer chain. Preferably, the macromolecular monomer has a substantially uniform molecular weight distribution such that its ratio of $\overline{M}w/\overline{M}n$ is less than about 1.1.

The polymerizable monofunctional macromolecular monomer is preferably a tapered block copolymer comprising a polymer of a mono-alkenyl-substituted aromatic hydrocarbon "A" having a molecular weight in the range of from about 2,000 to about 25,000, preferably a molecular weight in the range of from about 5,000 to 25,000, and more preferably in the range of from about 5,000 to about 15,000. The polymer of the mono-alkenyl-substituted aromatic hydrocarbon is chemically bonded to a group designated as "B-C-A'", wherein the group designated as "B" is a polymer of a conjugated diene, the group designated as "C" is a tapered or graded block of a conjugated diene and a mono-alkenyl-substituted, aromatic hydrocarbon, and the group designated as "A'" is a polymer of a mono-alkenyl-substituted aromatic hydrocarbon. Preferably the conjugated diene is butadiene or isoprene. The molecular weight of the group "B-C-A'" is between about 1,500 and 48,000, preferably in the range of from about 7,000 to 35,000, and more preferably in the range of from about 10,000 to 35,000.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. A copolymerizable tapered block macromolecular monomer of the formula:

I — A — B — C — A' — X wherein I is the residue of a monofunctional anionic initiator "A" and "A'" are each a polymerized mono-alkenyl-substituted aromatic hydrocarbon, "B" is a polymer of a conjugated diene, "C" is a tapered copolymer of a mono-alkenyl-substituted aromatic hydrocarbon and a conjugated diene, "X" is a copolymerizable end group containing either a vinyl moiety, a vinylene moiety, an epoxy moiety, or a thioepoxy moiety, said tapered block macromolecular monomer having a molecular weight in the range of from about 5,000 to about 50,000 and being further characterized as having no more than one vinyl moiety, vinylene moiety, epoxy, or thioepoxy moiety on the terminal portion per linear copolymer chain.

2. The copolymerizable tapered block macromolecular monomer of claim 1, wherein said copolymerizable end group designated as "X" is selected from the group consisting of:

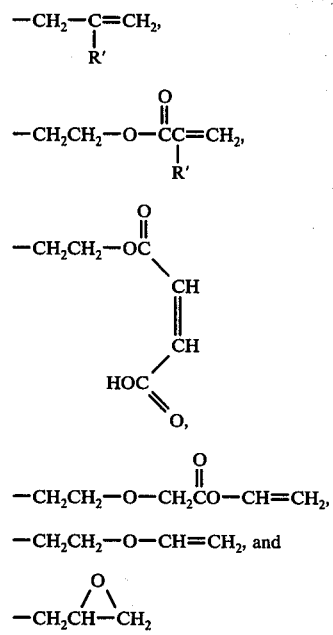

wherein R' is either hydrogen or lower alkyl.

3. The copolymerizable tapered block macromolecular monomer of claim 1, wherein said copolymerizable end group designated as "X" is selected from the group consisting of:

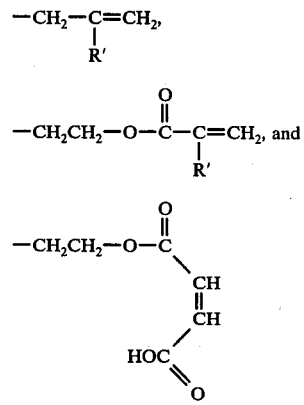

wherein R' is either hydrogen or methyl.

4. The copolymerizable tapered block macromolecular monomer of claim 1, wherein said portions designated as "A" and "A'" are each a polymer of styrene, said portion designated as "B" is a polymer of butadiene or isoprene and said copolymer portion designated as "C" is a copolymer of styrene with butadiene or isoprene.

5. The copolymerizable tapered block macromolecular monomer of claim 1, wherein, in said tapered copolymer designated as "C" and said portion designated as "A'", said mono-alkenyl-substituted aromatic hydrocarbon moieties are formed from a mixture of styrene and alpha-methyl styrene.

6. The copolymerizable tapered block macromolecular monomer of claim 1, wherein said portion designated as "A" has a molecular weight in the range of from about 2,000 to about 25,000 and said portion designated as "B-C-A'" has a molecular weight in the range of from about 1,500 to about 48,000.

7. The copolymerizable tapered block macromolecular monomer of claim 1, wherein said portion designated as "A" has a molecular weight in the range of from about 5,000 to about 25,000 and said portion designated as "B-C-A'" has a molecular weight in the range of from about 7,000 to about 35,000.

8. The copolymerizable tapered block macromolecular monomer of claim 1, wherein said portion designated as "A" has a molecular weight in the range of from about 5,000 to about 15,000 and said portion designated as "B-C-A'" has a molecular weight in the range of from about 10,000 to about 35,000.

9. The copolymerizable tapered block macromolecular monomer of claim 6, wherein the copolymerizable end group designated as "X" is

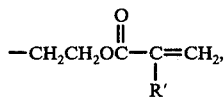

wherein R' is either hydrogen or methyl.

10. The copolymerizable tapered block macromolecular monomer of claim 7, wherein the copolymerizable end group designated as "X" is

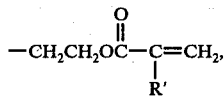

wherein R' is either hydrogen or methyl.

11. The copolymerizable tapered block macromolecular monomer of claim 9, wherein said portions designated as "A" and "A'" are polymers of styrene, said portion designated as "B" is a polymer of isoprene, said portion designated as "C" is a copolymer of styrene and isoprene and R' of the group "X" is methyl.

12. A copolymerizable tapered block macromolecular monomer of the formula:

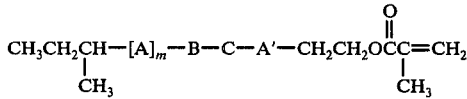

wherein the portion designated as "A" is a polymer of styrene, m is a positive integer such that the molecular weight of the portion designated as "A" is about 5,000 to 15,000, "B" is a polymer of butadiene or isoprene, "C" is a tapered copolymer of styrene with butadiene or isoprene and "A'" is a polymer of styrene, the molecular weight of the copolymer designated as "B-C-A'" is about 7,000 to 35,000, said copolymerizable tapered block macromolecular monomer being characterized as having a substantially uniform molecular weight distribution such that its ratio of $\overline{M}w/\overline{M}n$ is less than about 1.1.

13. A polymerizable tapered block macromolecular monomer of the formula:

wherein the portion designated as "I" is the residue of an anionic initiator, the portion designated as "A" is a polymerized mono-alkenyl-substituted aromatic hydrocarbon having a molecular weight in the range of from about 2,000 to about 25,000, the portion designated as "B" is a polymer of a conjugated diene, the portion designated as "C" is a copolymer of a mono-alkenyl-substituted aromatic hydrocarbon and a conjugated diene, the portion designated as "A'" is a polymer of a mono-alkenyl-substituted aromatic hydrocarbon, said portion designated as "B-C-A'" has a molecular weight in the range of from about 1,500 to about 48,000, and said portion designated as "X" is a copolymerizable moiety of the formula:

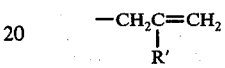

wherein R' is either hydrogen or methyl, said copolymerizable tapered block macromolecular monomer being characterized as having a substantially uniform molecular weight distribution such that its ratio of $\overline{M}w/\overline{M}n$ is less than about 1.1.

14. The copolymerizable tapered block macromolecular monomer of claim 13, wherein said portion designated as "A" has a molecular weight in the range of from about 2,000 to about 25,000 and said portion designated as "B-C-A'" has a molecular weight in the range of from about 1,500 to about 48,000.

15. The copolymerizable tapered block macromolecular monomer of claim 13, wherein said portion designated as "A" has a molecular weight in the range of from about 5,000 to about 15,000 and said copolymer portion designated as "B-C-A'" has a molecular weight in the range of from about 10,000 to about 35,000.

16. The copolymerizable tapered block macromolecular monomer of claim 13, wherein said portion designated as "A" is a polymer of styrene, said portion designated as "B" is a polymer of isoprene, and said copolymer portion designated as "C" is a copolymer styrene with isoprene, said portion designated as "A'" is a polymer of styrene, and R' is hydrogen.

17. A copolymerizable tapered block macromolecular monomer of the formula:

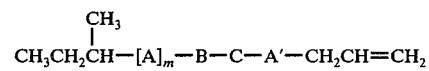

wherein the portion designated as "A" is a polymer of styrene, m is a positive integer such that the molecular weight of the portion designated as "A" is in the range of from about 2,000 to about 25,000, the portion designated as "B" is a polymer of isoprene, the portion designated as "C" is a copolymer of styrene and isoprene, the portion designated as "A'" is a polymer of styrene, and the molecular weight of the copolymer portion designated as "B-C-A'" is in the range of from about 1,500 to about 48,000, said copolymerizable tapered block macromolecular monomer being characterized as having a substantially uniform molecular weight distribution such that the ratio of $\overline{M}w/\overline{M}n$ is less than about 1.1.

18. The copolymerizable tapered block macromolecular monomer of claim 17, wherein m is a positive integer such that the molecular weight of the portion designated as "A" is about 10,000, and the molecular weight of the copolymer portion designated "B-C-A'" is about 10,000.

19. The copolymerizable tapered block macromolecular monomer of claim 17, wherein $m$ is a positive integer such that the molecular weight of the portion designated as "A" is about 4,000, and the molecular weight of the copolymer portion designated as "B-C-A'" is about 16,000.

20. The copolymerizable tapered block macromolecular monomer of claim 17, wherein $m$ is a positive integer such that the molecular weight of the portion designated as "A" is about 13,000, and the molecular weight of the copolymer portion designated as "B-C-A'" is about 7,000.

21. The copolymerizable tapered block macromolecular monomer of claim 17, wherein $m$ is a positive integer such that the molecular weight of the portion designated as "A" is about 10,000, and the molecular weight of the copolymer portion designated as "B-C-A'" is about 2,000.

22. A process for preparing a copolymerizable tapered block macromolecular monomer comprising the steps:
   a. anionically polymerizing a mono-alkenyl-substituted aromatic hydrocarbon in the presence of an alkali metal hydrocarbyl anionic polymerization initiator to produce a monofunctional living polymer of said mono-alkenyl-substituted aromatic hydrocarbon,
   b. reacting said monofunctional living polymer with a mixture of a mono-alkenyl-substituted aromatic hydrocarbon and a conjugated diene to obtain a monofunctional living tapered block macromolecular monomer,
   c. reacting said monofunctional living tapered block macromolecular monomer with an alkylene oxide capping agent to obtain a monofunctional alkoxide anion terminated tapered block macromolecular monomer, and
   d. reacting said monofunctional alkoxide terminated tapered block macromolecular monomer with a compound selected from the group consisting of an acrylyl halide, methacrylyl halide, and maleic anhydride to produce said copolymerizable tapered block macromolecular monomer having a copolymerizable end group.

23. The process of claim 22, wherein said mono-alkenyl-substituted aromatic hydrocarbon is styrene and said conjugated diene is a member selected from the group consisting of butadiene and isoprene.

24. The process of claim 23, wherein said capping agent is ethylene oxide.

25. The process of claim 23, wherein said anionic polymerization initiator is secondary butyl lithium.

26. The process of claim 22, wherein said mono-alkenyl-substituted aromatic hydrocarbon is polymerized to a molecular weight in the range of from about 2,000 to about 25,000 and said copolymer portion produced from step (b) is polymerized to a molecular weight in the range of from about 1,500 to about 48,000.

27. The process of claim 22, wherein said copolymerizable tapered block copolymer produced in step (b) has a molecular weight in the range of from about 5,000 to about 50,000.

28. The process of claim 22, wherein said copolymerization is conducted in an inert hydrocarbon solvent.

29. A chemically joined, phase separated thermoplastic graft copolymer of:
   (1) from about 1% to about 95% by weight of a copolymerizable tapered block macromolecular monomer of the formula:

wherein "I" is the residue of an anionic initiator, "A" and "A'" are each a polymerized mono-alkenyl-substituted aromatic hydrocarbon, "B" is polymer of a conjugated diene, "C" is a tapered copolymer of a mono-alkenyl-substituted aromatic hydrocarbon and a conjugated diene, "X" is a copolymerizable end group, said tapered block macromolecular monomer having a molecular weight in the range of from about 5,000 to about 50,000 and having a substantially uniform molecular weight distribution such that its ratio of $\overline{M}w/\overline{M}n$ is less than about 1.1, said tapered block macromolecular monomer being further characterized as having no more than one copolymerizable end group on the terminal portion per linear macromolecular monomer chain, copolymerized with
   (2) from about 99% to about 5% by weight of a copolymerizable comonomer forming the polymeric backbone of said graft copolymer and said copolymerizable tapered block macromolecular monomer forming linear polymeric side chains of said graft copolymer, wherein:
      (a) the polymeric backbone of the graft copolymer is comprised of polymerized units of said copolymerizable comonomer, said copolymerizable comonomer being at least one ethylenically-unsaturated monomer, and mixtures thereof;
      (b) the linear polymeric side chains of the graft copolymer are comprised of said copolymerized tapered block macromolecular monomers, said copolymerization occurring between the copolymerizable end group of said macromolecular monomer and said copolymerizable comonomer; and
      (c) the linear polymeric side chains of the graft copolymer which are copolymerized into the copolymeric backbones are separated by at least about 20 uninterrupted recurring monomeric units of said backbone polymer, the distribution of the side chains along the backbones being controlled by the relative reactivity ratios of (1) the polymerizable end group on said copolymerized tapered block macromolecular monomer and (2) said copolymerizable comonomer.

30. The graft copolymer of claim 29, wherein said copolymerizable comonomer contains at least one vinylidene group:

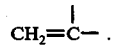

31. The graft copolymer of claim 29, wherein said copolymerizable comonomer is an ethylenically-unsaturated monomer containing at least one vinylidene group selected from the group consisting of acrylic acid, methacrylic acid, the alkyl esters of acrylic and methacrylic acids, acrylonitrile, methacrylonitrile, acrylamide, methacrylamide, N,N-dimethylacrylamide, vinylidene cyanide, vinyl acetate, vinyl propionate, vinyl chloracetate, fumaric acid and esters, maleic anhydrides, acids and esters, and comonomeric mixtures thereof.

32. The graft copolymer of claim 29, wherein said copolymerizable end group "X" contains either a vinyl moiety, a vinylene moiety, an epoxy moiety, a thio-epoxy moiety or a glycol moiety, and said tapered block macromolecular monomer containing no more than one such moiety on the terminal portion per macromolecular monomer chain.

33. The graft copolymer of claim 29, wherein said copolymerizable comonomer is a non-polar comonomer.

34. A graft copolymer according to claim 33, wherein said non-polar comonomer is a member selected from the group consisting of ethylene, propylene, butene-1, styrene, alphamethyl styrene and mixtures thereof.

35. A graft copolymer according to claim 29, wherein in said tapered copolymer designated as "C" and said portion designated as "A'", said mono-alkenyl-substituted aromatic hydrocarbon moieties are formed from a mixture of styrene and alpha-methyl styrene.

36. The graft copolymer of claim 29, wherein, in said copolymerizable tapered block macromolecular monomer, said portion designated as "A" is a polymer of styrene, said portion designated as "B" is a polymer of isoprene, said portion designated as "C" is a tapered copolymer of styrene and isoprene, said portion designated as "A'" is a polymer of styrene, and said portion designated as "X" is

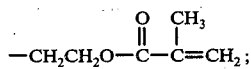

and said copolymerizable comonomer is styrene.

37. The graft copolymer of claim 36, wherein, in said copolymerizable tapered block macromolecular monomer, the molecular weight of the portion designated as "A" is about 10,000, said portion designated as "B-C-A'" contains about 20% styrene and its molecular weight is about 25,000.

38. The graft copolymer of claim 36, wherein, in said copolymerizable tapered block macromolecular monomer, the molecular weight of the portion designated as "A" is about 5,000 to 25,000, said portion designated as "B-C-A'" contains about 40% styrene and its molecular weight is about 7,000 to 35,000.

39. The graft copolymer of claim 36, wherein said copolymerizable tapered block macromolecular monomer has a molecular weight of about 50,000, the molecular weight of the portion designated as "A" is about 5,000 to 15,000, and said portion designated as "B-C-A'" contains about 10% styrene.

40. The graft copolymer of claim 29, wherein in said copolymerizable tapered block macromolecular monomer, said portion designated as "A" is a polymer of styrene, said portion designated as "B" is a polymer of isoprene, said portion designated as "C" is a tapered copolymer of styrene and isoprene, said portion designated as "A'" is a polymer of styrene, and said portion designated as "X" is —CH$_2$—CH=CH$_2$, said group designated as "B-C-A'" contains 10-40 percent styrene, and said copolymerizable comonomer is ethylene or propylene or mixtures thereof.

41. The graft copolymer of claim 40, wherein the copolymerizable comonomer is ethylene.

42. The graft copolymer of claim 40, wherein the copolymerizable comonomer is propylene.

43. The graft copolymer of claim 40, wherein the copolymerizable comonomer is a mixture of ethylene and propylene.

44. The graft copolymer of claim 29, wherein, in said copolymerizable tapered block macromolecular monomer, said portion designated as "A" is a polymer of styrene, said portion designated as "B" is a polymer of isoprene, said portion designated as "C" is a tapered copolymer of styrene and isoprene, said portion designated as "A'" is a polymer of styrene, and said portion designated as "X" is

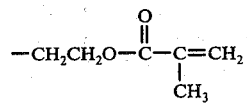

or

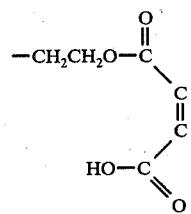

and said portion designated as "B-C-A'" contains about 10-40 percent styrene.

45. The graft copolymer of claim 44, wherein the copolymerizable comonomer is styrene.

46. A chemically joined, phase separated graft copolymer having the structure

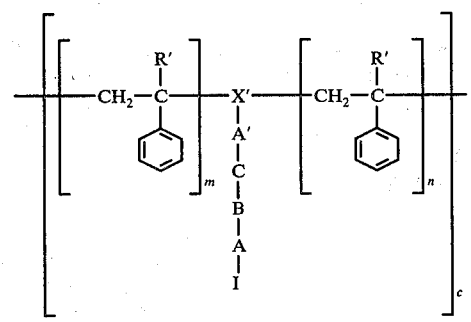

wherein c, m and n are positive integers, m and n are each at least about 20, and R' is H or CH$_3$-
(1) from about 1% to about 95% by weight of said graft copolymer being formed from a copolymerizable side-chain forming tapered block macromolecular monomer of the formula:

wherein "I" is the residue of an anionic initiator, "A" and "A'" are each a polymerized mono-alkenyl-substituted aromatic hydrocarbon, "B" is polymer of a conjugated diene, "C" is a tapered copolymer of a mono-alkenyl-substituted aromatic hydrocarbon and a conjugated diene, "X" is a copolymerizable end group containing either a vinyl moiety or a vinylene moiety, said tapered block macromolecular monomer having a molecular weight in the range of from about 5,000 to about 50,000 and having a substantially uniform molecular weight distribution such that its ratio of $\overline{M}w/\overline{M}n$ is less than about 1.1, said tapered block macromolecular monomer being further characterized as having no more than one vinyl moiety or vinylene moiety on the terminal portion per linear copolymer chain, and (2) the polymeric backbone-forming copolymerized comonomeric units

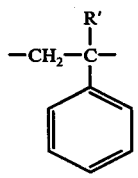

being formed from a copolymerizable comonomer and constituting from about 99% to about 5% by weight of said graft copolymer the distribution of the side chains along the backbones being controlled by the relative reactivity ratios of the polymerizable end group designated as "X" on said copolymerizable tapered block macromolecular monomer, and said copolymerizable comonomer.

47. The graft copolymer of claim 46, wherein the groups designated as "A" and "A'" are polymers of styrene, the group designated as "B" is a polymer of isoprene, the group designated as "C" is a tapered copolymer of styrene and isoprene.

48. The graft copolymer of claim 47, wherein the group designated as "X'" is

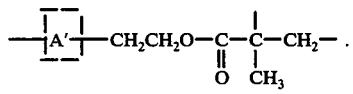

49. A chemically joined, phase separated graft copolymer having the structure

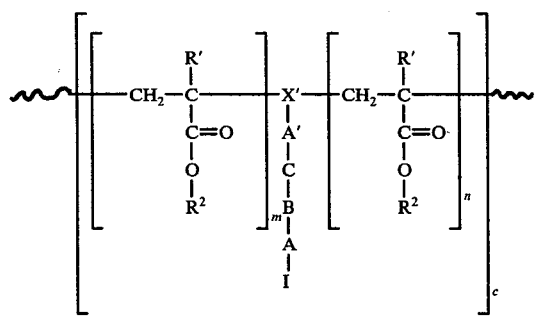

wherein $c$, $m$ and $n$ are positive integers, $m$ and $n$ are each at least about 20, and R' is H or $CH_3$-

(1) from about 1% to about 95% by weight of said graft copolymer being formed from a copolymerizable side-chain forming tapered block macromolecular monomer of the formula:

wherein "I" is the residue of an anionic initiator, "A" and "A'" are each a polymerized mono-alkenyl-substituted aromatic hydrocarbon, "B" is polymer of a conjugated diene, "C" is a tapered copolymer of a mono-alkenyl-substituted aromatic hydrocarbon and a conjugated diene, "X" is a copolymerizable end group containing either a vinyl moiety or a vinylene moiety, said tapered block macromolecular monomer having a molecular weight in the range of from about 5,000 to about 50,000 and having a substantially uniform molecular weight distribution such that its ratio of $\overline{M}w/\overline{M}n$ is less than about 1.1, said tapered block macromolecular monomer being further characterized as having no more than one vinyl moiety or vinylene moiety on the terminal portion per linear copolymer chain, and (2) the polymeric backbone-forming copolymerized comonomeric units

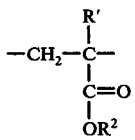

being formed from a copolymerizable comonomer and constituting from about 99% to about 5% by weight of said graft copolymer the distribution of the side chains along the backbones being controlled by the relative reactivity ratios of the polymerizable end group designated as "X" on said copolymerizable tapered block macromolecular monomer, and said copolymerizable comonomer.

50. The graft copolymer of claim 49, wherein the groups designated as "A" and "A'" are polymers of styrene, the group designated as "B" is a polymer of isoprene, the group designated as "C" is a tapered copolymer of styrene and isoprene.

51. The graft copolymer of claim 50, wherein the group designated as "X'" is

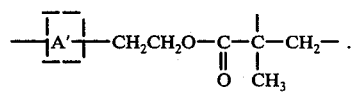

52. A chemically joined, phase separated graft copolymer having the structure

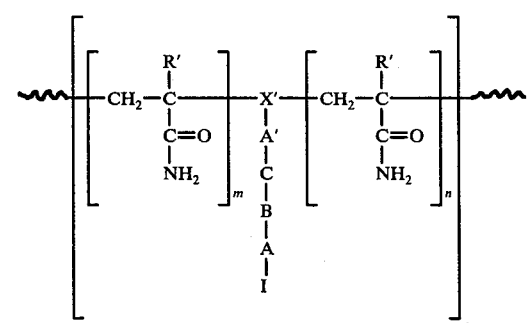

wherein $c$, $m$ and $n$ are positive integers, $m$ and $n$ are each at least about 20, and R' is H or $CH_3$-

(1) from about 1% to about 95% by weight of said graft copolymer being formed from a copolymerizable side-chain forming tapered block macromolecular monomer of the formula:

wherein "I" is the residue of an anionic initiator, "A" and "A'" are each a polymerized mono-alkenyl-substituted aromatic hydrocarbon, "B" is polymer of a conjugated diene, "C" is a tapered copolymer of a mono-alkenyl-substituted aromatic hydrocarbon and a conjugated diene, "X" is a copolymerizable end group containing either a vinyl moiety or a vinylene moiety, said tapered block macromolecular monomer having a molecular weight in the range of from about 5,000 to about 50,000 and having a substantially uniform molecular weight distribution such that its ratio of $\overline{M}w/\overline{M}n$ is less than about 1.1, said tapered block macromolecular monomer being further characterized as having no more than one vinyl moiety or vinylene moiety on the terminal portion per linear copolymer chain, and (2) the polymeric backbone-forming copolymerized comonomeric units

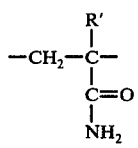

being formed from a copolymerizable comonomer and constituting from about 99% to about 5% by weight of said graft copolymer the distribution of the side chains along the backbones being controlled by the relative reactivity ratios of the polymerizable end group designated as "X" on said copolymerizable tapered block macromolecular monomer, and said copolymerizable comonomer.

53. The graft copolymer of claim 52, wherein the groups designated as "A" and "A'" are polymers of styrene, the group designated as "B" is a polymer of isoprene, the group designated as "C" is a tapered copolymer of styrene and isoprene.

54. The graft copolymer of claim 53, wherein the group designated as "X'" is

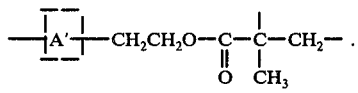

55. A chemically joined, phase separated graft copolymer having the structure

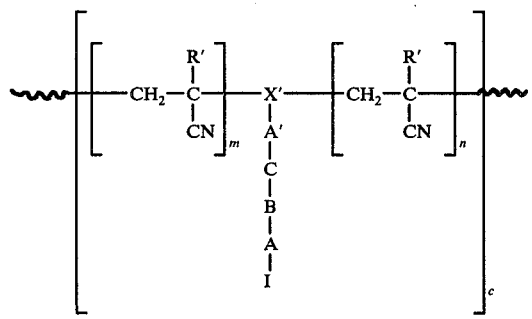

wherein c, m and n are positive integers, m and n are each at least about 20, and R' is H or CH$_3$ (1) from about 1% to about 95% by weight of said graft copolymer being formed from a copolymerizable side-chain forming tapered block macromolecular monomer of the formula:

wherein "I" is the residue of an anionic initiator, "A" and "A'" are each a polymerized mono-alkenyl-substituted aromatic hydrocarbon, "B" is polymer of a conjugated diene, "C" is a tapered copolymer of a mono-alkenyl-substituted aromatic hydrocarbon and a conjugated diene, "X" is a copolymerizable end group containing either a vinyl moiety or a vinylene moiety, said tapered block macromolecular monomer having a molecular weight in the range of from about 5,000 to about 50,000 and having a substantially uniform molecular weight distribution such that its ratio of $\overline{M}w/\overline{M}n$ is less than about 1.1, said tapered block macromolecular monomer being further characterized as having no more than one vinyl moiety or vinylene moiety on the terminal portion per linear copolymer chain, and (2) the polymeric backbone-forming copolymerized comonomeric units

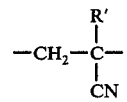

being formed from a copolymerizable comonomer and constituting from about 99% to about 5% by weight of said graft copolymer, the distribution of the side chains along the backbones being controlled by the relative reactivity ratios of the polymerizable end group designated as "X" on said copolymerizable tapered block macromolecular monomer and said copolymerizable comonomer.

56. The graft copolymer of claim 55, wherein the groups designated as "A" and "A'" are polymers of styrene, the group desigated as "B" is a polymer of isoprene, the group designated as "C" is a tapered copolymer of styrene and isoprene.

57. The graft copolymer of claim 56, wherein the group designated as "X'" is

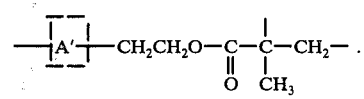

58. A chemically joined, phase separated thermoplastic graft copolymer of:

(1) from about 1% to about 95% by weight of a copolymerizable tapered block macromolecular monomer of the formula:

wherein "I" is the residue of an anionic initiator, "A" and "A'" are each a polymerized mono-alkenyl-substituted aromatic hydrocarbon, "B" is polymer of a conjugated diene, "C" is a tapered copolymer of a mono-alkenyl-substituted aromatic hydrocarbon and a conjugated diene, "X" is a copolymerizable end group containing an epoxy, thioepoxy or glycol moiety, said tapered block macromolecular monomer having a molecular weight in the range of from about 5,000 to about 50,000, said tapered block macromolecular monomer being further characterized as having no more than one copolymerizable end group on the terminal portion per linear macromolecular monomer chain, copolymerized with (2) from about 99% to about 5% by weight of a copolymerizable comonomer forming the polymeric backbone of said graft copolymer and said copolymerizable tapered block macromolecular monomer forming linear polymeric side chains of said graft copolymer, wherein:

(a) the polymeric backbone of the graft copolymer is comprised of polymerized units of said copolymerizable comonomer, said copolymerizable comonomer being at least one diisocyanate;

(b) the linear polymeric side chains of the graft copolymer are comprised of said copolymerized tapered block macromolecular monomers, said copolymerization occurring between the copolymerizable end group of said macromolecular monomer and said copolymerizable comonomer; and (c) the linear polymeric side chains of the graft copolymer which are copolymerized into the copolymeric backbones are separated by at least about 20 uninterrupted recurring monomeric units of said backbone polymer.

59. The graft copolymer of claim 58, wherein said macromolecular monomer has a substantially uniform molecular weight distribution such that its ratio of $\overline{M}w/\overline{M}n$ is less than about 1.1.

60. A graft copolymer as described in claim 58, wherein in said macromolecular monomer, "A" and "A'" are each polymers of styrene, "B" is a polymer of isoprene or butadiene, "C" is a tapered copolymer of styrene with isoprene or butadiene, and "X" is epichlorohydrin.

61. A graft copolymer as described in claim 58, wherein in said macromolecular monomer, "A" and "A'" are each polymers of styrene, "B" is a polymer of isoprene or butadiene, "C" is a tapered copolymer of styrene with isoprene or butadiene, and "X" is a glycol group.

* * * * *